P. E. FOUCAR.
MOLDING MACHINE FOR DOUGH AND THE LIKE.
APPLICATION FILED JULY 6, 1912.

1,069,245.

Patented Aug. 5, 1913.

WITNESSES:
John C. Sanders
Albert F. Heuman

INVENTOR:
Philipp Eduard Foucar
BY
ATTY.

UNITED STATES PATENT OFFICE.

PHILIPP EDUARD FOUCAR, OF DUSSELDORF-OBERBILK, GERMANY.

MOLDING-MACHINE FOR DOUGH AND THE LIKE.

1,069,245.     Specification of Letters Patent.     Patented Aug. 5, 1913.

Application filed July 6, 1912. Serial No. 707,964.

*To all whom it may concern:*

Be it known that I, PHILIPP EDUARD FOUCAR, engineer, subject of the Emperor of Germany, residing at Dusseldorf-Oberbilk, Germany, have invented new and useful Improvements in Molding-Machines for Dough and the Like, of which the following is a specification.

This invention relates to molding machines for dough and the like and is generally applicable to all classes of machines for treating dough for the purposes of molding and shaping the same.

In all previous machines, it has been necessary before treating the dough to dust the contacting surfaces with flour. This dusting with flour was necessary before each operation and had to be effected with considerable care in order to avoid sticking of the dough. Suggestions have been made to provide permanent coverings but so far as I am aware nothing satisfactory has yet been discovered.

The object of the present invention is to provide any machine of the type described with a form of covering which will be effective even after some considerable time of use.

According to the present invention the surfaces of the machine which come in contact with the dough are provided with a covering having a short upright pile. In this way the dough during treatment does not come in contact with a more or less flattened surface, but is treated by what might be called point contact. A suitable covering for the purpose is a velvet or plush with a short upright pile.

It will be understood that the invention may be applied to any form of machine for molding or shaping dough and for the purposes of illustration I have indicated somewhat roughly one suitable form of molding machine to which the present invention may be applied.

Figure 1:
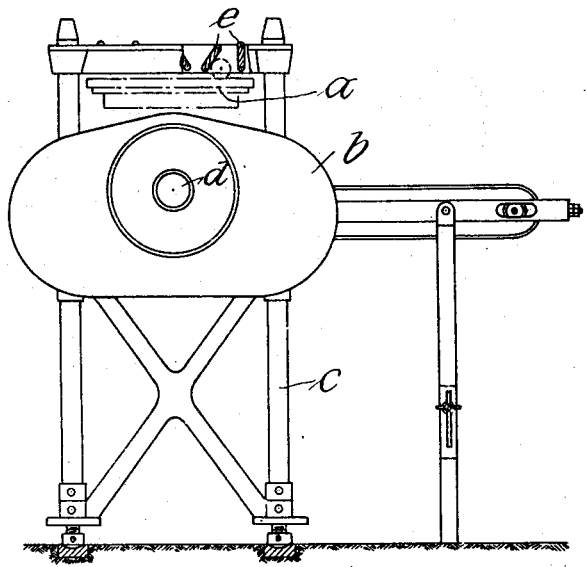
Figure 2:
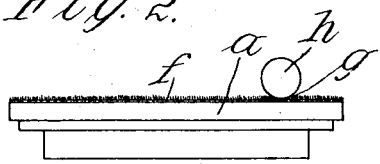

The machine is shown in elevation in Figure 1, while in Fig. 2 I have shown my invention applied to one part of a machine as shown in Fig. 1.

This machine comprises a table $a$, movable by mechanism contained behind the casing $b$, and operated from a shaft $d$. The table $a$, mechanism, and shaft $d$, are all supported in a frame $c$. The movable table $a$, forms one contacting surface, and another contacting surface may be formed by adjustable bars $e$.

The object of the present invention, as explained above, is to provide the contacting surfaces of the table $a$, and plates $e$, with a suitable covering which will render it unnecessary to dust these surfaces with flour before each operation.

According to the present invention, the contacting parts are provided with a covering $f$, having a short substantially vertical pile $g$. As can be seen in Fig. 2, the covering $f$, is shown applied to the top surface of the table $a$, so that the piles $g$, project upwardly from the table whereby the dough $h$, to be worked, does not contact with any other surfaces but rests on the points of the pile. The depth of the pile is measured with a view to its retaining its upright position under the weight of the dough to be treated. A suitable material for the covering $f$, is plush, or velvet, or sheepskin, having its pile shorn to the desired degree. Coverings of velvet or sheepskin have the advantage that any particles of dough sticking between the hairs or pile may be very easily removed.

This invention is not applicable to kneading machines proper, which necessitate a certain amount of contacting and adhesion of the parts to the dough.

I claim:

1. In combination with a molding, shaping and similar working surface for dough and the like, a covering therefor having a short upright pile.

2. In combination with a molding and shaping table, means for preventing sticking of the dough comprising a covering of fabric with short upright pile.

3. In combination in a machine for molding or shaping dough, a covering for the working surfaces composed of plush, having a short upright pile.

In testimony whereof I have signed my name to this specification in the presence of two subscribing witnesses.

PHILIPP EDUARD FOUCAR. [L. S.]

Witnesses:
HELEN NUFER,
ALBERT NUFER.